(12) United States Patent
Mayer

(10) Patent No.: US 8,731,159 B2
(45) Date of Patent: *May 20, 2014

(54) FINANCIAL CARD ACTIVATION METHOD AND SYSTEM

(75) Inventor: Daniel J. Mayer, Warren, NJ (US)

(73) Assignee: IDT Corporation, Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/104,502

(22) Filed: May 10, 2011

(65) Prior Publication Data

US 2011/0211681 A1 Sep. 1, 2011

Related U.S. Application Data

(63) Continuation of application No. 11/605,279, filed on Nov. 29, 2006, now Pat. No. 7,940,903.

(51) Int. Cl.
*H04M 15/00* (2006.01)

(52) U.S. Cl.
USPC .................................. 379/114.2; 379/114.15

(58) Field of Classification Search
USPC ............... 379/114.15, 114.16, 114.19, 114.2; 705/16, 64, 67; 235/380, 381
See application file for complete search history.

(56) References Cited

U.S. PATENT DOCUMENTS

| 5,868,236 A * | 2/1999 | Rademacher ................. 194/217 |
| 5,915,007 A * | 6/1999 | Klapka ...................... 379/114.18 |
| 6,473,500 B1 * | 10/2002 | Risafi et al. .............. 379/144.01 |
| 7,940,903 B2 * | 5/2011 | Mayer ........................ 379/114.2 |
| 2004/0047459 A1 * | 3/2004 | Diaz ........................ 379/144.01 |
| 2009/0177552 A1 * | 7/2009 | Caven et al. ................... 705/21 |

* cited by examiner

*Primary Examiner* — Quoc D Tran
(74) *Attorney, Agent, or Firm* — Davidson Berquist Jackson & Gowdey, LLP

(57) ABSTRACT

A sponsor purchases a prepaid card that can be transmitted to an intended user with increased security. Using a prepaid card dispenser, the sponsor elects an amount for the prepaid card and is prompted for at least one telephone number at which a server platform should contact the sponsor when the intended user wants to authenticate the card. The sponsor may enter additional phone numbers that will be called if the sponsor does not answer the first number when called by the server platform. When an intended user has received the prepaid card, the intended user calls a telephone number associated with the server platform and is connected to the sponsor via a telephone bridge so that the sponsor may authenticate the intended user. The sponsor may then inform the server platform (e.g., via DTMF tones) that the card has been authenticated.

9 Claims, 2 Drawing Sheets

US 8,731,159 B2

FINANCIAL CARD ACTIVATION METHOD AND SYSTEM

FIELD OF INVENTION

The present invention is directed to a method and system for controlling activation of a financial card, and in one embodiment to a method and system for controlling activation of a pre-paid gift card.

DISCUSSION OF THE BACKGROUND

Known systems enable dispensing and activation of pre-paid cards, such as may be used in the telephone industry. Exemplary patents relating to pre-paid cards include U.S. Pat. Nos. 6,973,172 and 6,957,737. Such systems generally are designed to dispense a card or printed paper to the ultimate user of the card or printed paper or at least to someone that can securely transfer the card or printed paper to the intended user.

However, there are circumstances under which the purchaser of the card or printed paper is not the intended user of the card or printed paper and there is no secure method of transferring the card or printed paper to the intended user. For example, if a child is away at camp and a parent wants to send a prepaid calling card to the child, the card is at risk in the mail because the card has been activated by the parent at the time of purchase. Similarly, prepaid cards are often bought by sponsors, and then gifted to users. The gifting process often involves delivering prepaid cards by insecure delivery channels such as mail or public networks.

In credit card systems, there exist authorization methods whereby a card issuer sends a credit card to a customer and requests (e.g., via a sticker on the card) that the customer call an authorization center using the telephone number that is registered to the account. Alternatively, other confidential information about the customer's account (e.g., the primary account holder's mother's maiden name) can be used to authenticate the card. However, as such information is confidential to the account, one would not want to disclose such information to a third party just to give that third party a prepaid card.

Accordingly, there is a need to address the national and international transfer of focused payments among different parties, e.g., relatives and friends. Similarly, there is a need to avoid known insecure delivery methods which might result in stolen or misdelivered physical or virtual cards which can be used by persons who were not the users intended by the sponsor.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
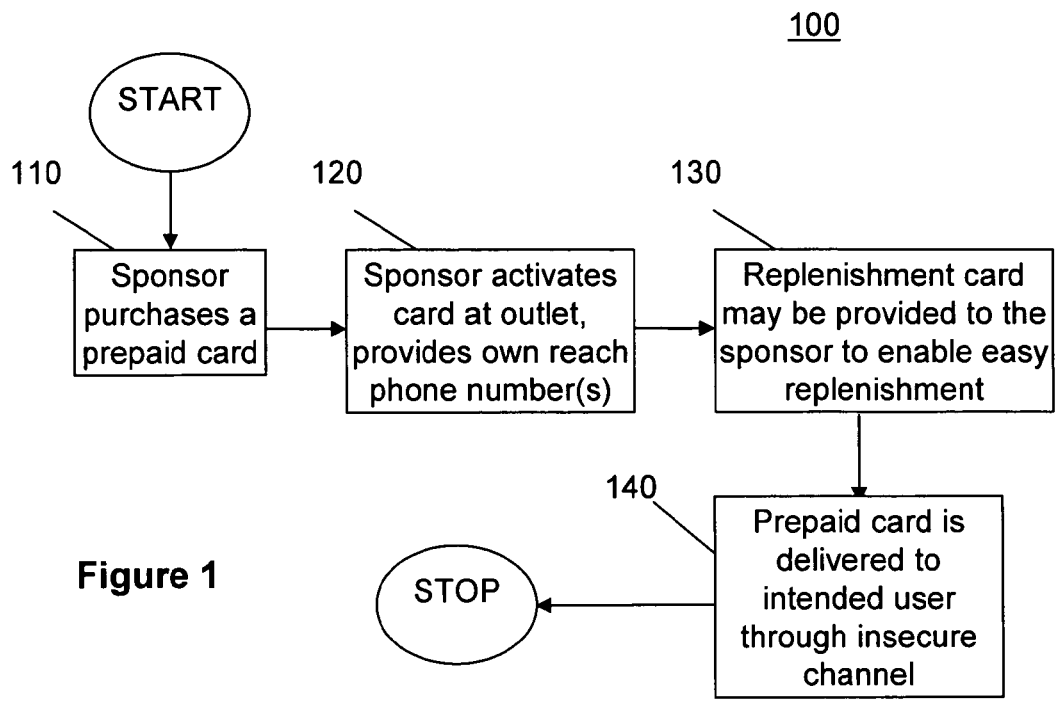
FIG. 1 is a flowchart showing an exemplary method of purchasing a prepaid card according to a method described herein.

FIG. 1 illustrates a purchasing method 100. In step 110, a "sponsor" (e.g., a parent) buys a prepaid card (e.g., at a retail outlet or at an online site) that is intended to be used by a user (e.g., a relative such as a child that is remotely located from the sponsor). Such a user may be referred to herein as an "intended user."

The sponsor specifies an initial value of the card that is being prepaid. The sponsor may optionally be able to specify the currency that the card is to "hold." For example, the card may be purchased by a sponsor with US dollars but "hold" Euros when the seller receives payment (e.g., with the conversion being made at the current rate of the day when the card is purchased). The conversion to a second currency may require the payment of a conversion fee (e.g., a one-time fee). (The buyer or seller alternatively may utilize a hybrid approach where a conversion fee is waived in exchange for a less favorable conversion rate.) In another embodiment, the card may hold a first currency, and when/if the card is used in an area or country that uses a second currency, the currency is exchanged for the purchase at the then rate of the day, optionally with a conversion fee, or using the hybrid approach.

After purchase, the capabilities of the card are initially restricted such that any attempted use of the prepaid card actually causes the sponsor to be contacted such that the sponsor can determine if the prepaid card has been securely delivered. For example, in step 120, the sponsor provides at least one telephone number which initially permits the intended user only to call the sponsor. All other uses of the card are disabled. In step 130, the sponsor sends the card to the intended user via some insecure channel (physical mail, hand-delivery by a go-between, email . . . ).

In one embodiment, the card also functions as a greeting card, or is enclosed with a greeting card. In another embodiment, the original purchase takes place over the phone or on a website. The mailing of a physical card or a virtual card to the intended user may be performed as part of the process of selling the prepaid cards. In yet another embodiment, the gifted amount is billed to a post-paid telephony account, or deducted from a prepaid telephony account; one example of the latter is a prepaid cell-phone, which can then become the means for enabling the intended user to reach the sponsor. The card also may be dispensed in other ways (e.g., by a cashier, from a vending machine, or from an ATM-like machine). As should be understood by those of ordinary skill in the art, a prepaid "card" need not be a physical card but may instead be simply an account number (e.g., that is printed or electronic) that is associated with the pre-payment.

In another embodiment, the sponsor may purchase a gift card based on a pre-existing prepaid account. Examples for such pre-existing accounts include prepaid cell-phone accounts and debit-card accounts, including prepaid accounts used as instruments of payment (e.g., from employer to employee).

In an exemplary embodiment, a sponsor inserts an ATM card into an ATM machine and enters the ATM PIN. Instead of withdrawing money, the sponsor selects a menu option which creates a prepaid card (potentially specifying the type of card such as a prepaid telephone card). Having selected the prepaid card option, the sponsor elects an amount to be withdrawn and an account type (e.g., checking, savings or credit card account) to cover the purchase of the prepaid card. (There may be a fee associated with the creation of a new prepaid card.) Having selected an amount (and optionally a card type), the ATM machine prompts the user for at least one phone number (e.g., 973-555-1212 which is a home number) at which the server platform should contact the sponsor when the intended user wants to authenticate the card. The sponsor may then enter additional phone numbers (e.g., 973-555-1111 which is a cell phone) that will be called if the sponsor does not answer the first number when called by the server platform. The ATM machine may then also prompt the sponsor for an authentication code which identifies/authenticates the sponsor to the server platform when the server platform calls the sponsor at one of the phone number(s) entered by the sponsor (as described in greater detail below).

The prepaid card is then dispensed to the sponsor (or sent (e.g., via mail or email) directly to the intended user) with sufficient information to enable the card's activation and use. Such information may include an account number and a telephone number to call to use the card. In the ATM example, the ATM may print the information on one or more sides. For example, the ATM machine may start with a blank card onto which a logo (e.g., for visually identifying the store or service associated with the card) and an account number are printed on the front and a telephone number is printed on the back. The card may further include a magnetic strip or RF chip for providing information about the card and/or account to a merchant during a transaction/purchase.

Figure 2:
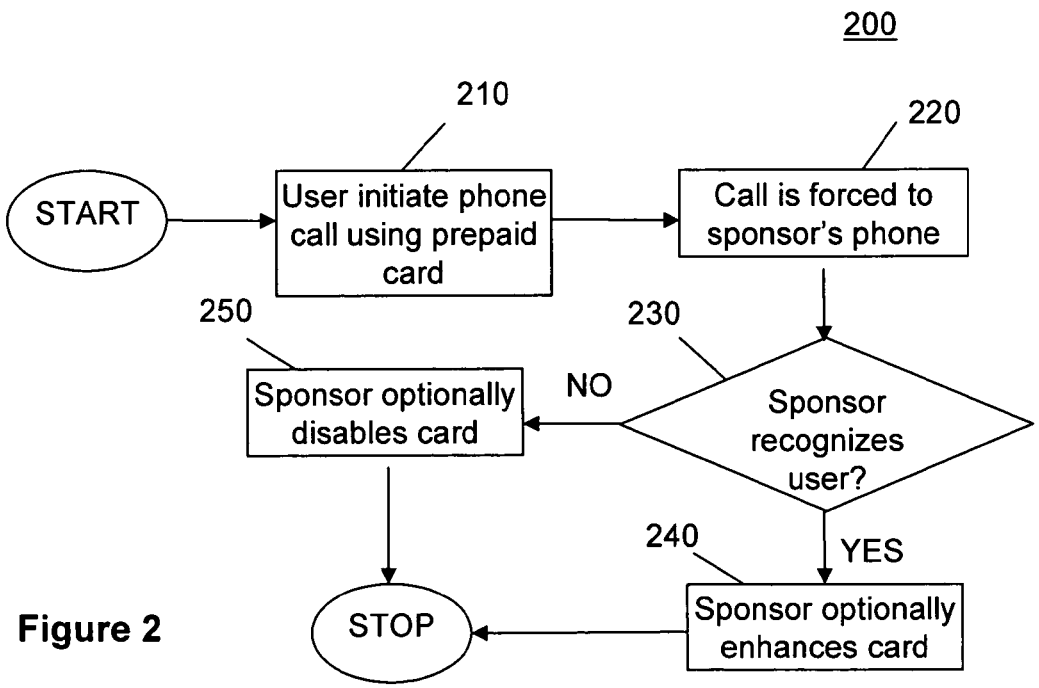
FIG. 2 is a flowchart showing an exemplary method of activating a prepaid card according to a method described herein.

FIG. 2 describes process 200, which depicts how the prepaid card's functionality may change once the user makes the initial contact with the sponsor. In step 210, the user dials a phone number associated with the prepaid card. In one embodiment, the phone number is unique to the card so that the account number need not be entered. It is sufficient for the server to simply determined the number that was called (e.g., using ANI) to determine what the corresponding account number is. In an alternate embodiment, after connection of the call to the server, the server prompts the caller for the corresponding account number. In either method, the server is able to determine the corresponding account number.

Once it has been determined that the corresponding account has not been activated, the server corresponding to the prepaid card informs the user (e.g., via a voice message using prerecorded voice or text-to-speech conversion) that the call is being redirected to the sponsor. In step 220, the server places the user's call on a bridge port, and the bridge dials the sponsor based on information provided during the purchase process, and stored at the prepaid platform keyed to information associated with the prepaid card (e.g., the printed account number). In step 220, if the sponsor answers the call, the bridge's VRU states that the upcoming call may be from the user (it may include a short message recorded by the VRU from the caller). The sponsor is then bridged to the user's call through the bridge, and the sponsor and the user can converse. From step 220, control passes to step 230 to determine if the intended user has received the prepaid card. In step 230, when the sponsor is satisfied that the intended intended user is speaking, control is passed to step 240.

In step 240, after the sponsor has authenticated the caller as the intended user, the sponsor may enhance, change or update the functionality of the card. This can be performed in a number of ways. For example, the communication bridge may spawn another call from the sponsor to a voice response unit (VRU), in which the sponsor follows a voice menu to permit such action. Further sponsor authentication may be performed at that point prior to the enhancement transaction. The sponsor is then reconnected with the user, and provides the details of the enhancement, if any.

Alternatively, the bridge may enable the sponsor to use his/her telephone keypad to enhance the card without requiring a separate call be placed to a VRU. For example, the sponsor depresses a first key (e.g., the "#" key), which causes the bridge to mute any further key presses from the sponsor. The bridge can then play messages and receive response keys or simply receive keypad responses from the sponsor without the knowledge of the caller. In yet another embodiment, the authorization for the enhancement may be performed using speech recognition via the telephone or using a completely separate interface (such as a computer and a WWW browser after or during the call).

Returning to step 230, if the sponsor is dissatisfied in step 230 that the caller is the intended user (or chooses to continue the limited functionality of the card even if the caller is the intended user), then control passes from step 230 to step 250. In step 250, the sponsor may disable the card, and may be eligible to receive a refund for the unused prepaid account represented by the card. Alternatively, the sponsor may choose to leave the card with its current limited use, limiting future card use to phone calls that terminate at the sponsor's phone. Such a "sponsor only" calling card may be useful in situations where a parent wishes a child to be able to call the parent with a prepaid long distance phone card but does not want the child to be able to call a boyfriend/girlfriend or friends. In one embodiment, method 200 stops after either step 240 or 250. In an alternate embodiment (not shown), method 200 includes prompting the intended user to input a PIN to control access to purchases/uses of the prepaid card. This allows the intended user to select his/her own PIN (which may be different than the ATM PIN).

At step 220, another alternative (not shown) is that the sponsor does not answer the user's call. In one such case, the caller may leave a voicemail that the sponsor later decides provides sufficient authentication that the user requests enhancement of the card. Having received the voicemail, the sponsor may perform the authentication via the Web, by calling a corresponding number or at the place of purchase.

To facilitate authentication, the voicemail interaction may be scripted by the sponsor to request details sufficient for gifted-party authentication (such as an account number to authenticate and a phone number to call or web site to visit). Additionally, the card can be enhanced later based on some other action or information (e.g., when the sponsor is satisfied such as after a later live conversation or after having received information from a trusted third-party).

The sponsor may additionally be able to change the functions of the prepaid card even after issuance of the card. For example, a sponsor may wish to recharge a card (e.g., with more money, units or goods) when the card has been used by the intended user. In an exemplary embodiment, a parent can recharge a prepaid long distance calling card after a traveling child has used some or all of the prepaid value. The sponsor may also wish to add other functions after issuance of the card. For example, if a parent gets a new cell phone number or wants to allow the child to also call his/her grandparents, then the sponsor could add or modify the allowable lists of numbers that can be called with the long distance calling card. Alternatively, if the prepaid card is a debit-style card, the sponsor may wish to disallow the card's use at a fast food restaurant and enable its use at the school bookstore.

Figure 3:
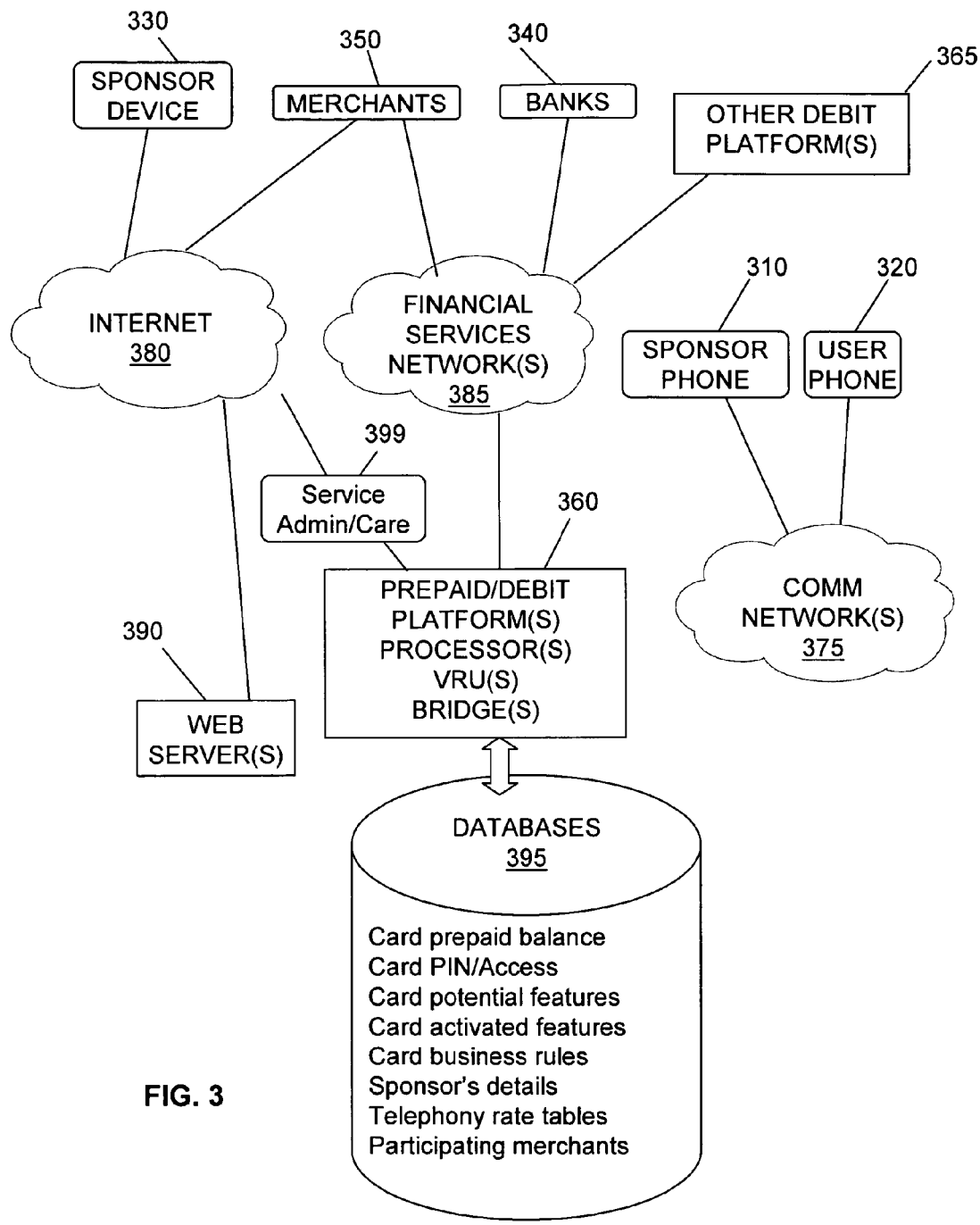
FIG. 3 is a block diagram of an exemplary system for controlling at least one of the methods of FIGS. 1 and 2.

FIG. 3 depicts a preferred embodiment of the architecture 300 of the system enabling the service. Entities that require connection to the system are the sponsor (via phone 310 and/or internet-connected device 330), the user (via phone 320), banks 340 (optional) that provide debit capabilities at merchant facilities accessible to the user, merchants 350 with debit card terminals, and service administrators/customer care 399.

System 300 uses at least three types of networks: (i) communications network 375 (e.g., the PSTN) enables the sponsor's phone 310 and the user's phone 320 to communicate with and through prepaid/debit platform 360; (ii) Internet 308 enables the sponsor through a device (e.g., PC) to purchase the prepaid card, and perhaps to transmit it to the user; in another embodiment (not depicted in FIG. 3), Internet 380 can be used by other card-service vendors to access platform 360 to self provision and maintain prepaid-card services they want to market; in that case, architecture 300 can serve the needs of multiple prepaid-service vendors; (iii) financial service network 385 is exemplified by the Visa network, and is used to route and mediate transactions between card-issuing banks and merchant 350 terminals authorized to use such cards; the use of this network is required for purchasing and activating the prepaid cards, and also for debit applications beyond telephony, where desired. The Internet may also be used to facilitate communication (or at least part of the communication) between the sponsor and the intended user. For example, the server may utilize a bridge using VoIP calling to connect the sponsor and the intended user, thereby reducing the cost of authentication. The server also may use instant messaging-style service to initiate an authenticating "conversation" between the sponsor and the intended user.

Prepaid/debit platform 360 represents a centralized version of a preferred embodiment of platforms enabling the services described herein. The major components of platform 360 are one or more instances of a processor, a voice-response unit, and a communications bridge. Within platform 360, "processors" refer to processing components; "VRU(s)" refer to Voice Response Unit(s), responsive to at least DTMF key presses from users and sponsors, and optionally including speech recognition capabilities); "bridges" enable the parking of calls on bridge ports in preparation for linking them to called parties and/or services as is routine in prepaid platforms. Each of these components can be integrated together in order to perform certain functions without having to connect to the other components, as described above.

The platform 360 is attached to databases 395, within which resides information about (i) each prepaid/debit card (account number, balance, PIN/access, potential features, activated features, business rules . . . ); (ii) sponsor details (called number(s) for pre-activation calls by the user, recharging number & PIN . . . ); user-relevant data (authentication state, user telephony-rate tables, user phone—if relevant); Participating Merchants and plans (e.g., store-specific debit cards).

Web server(s) 390 provide an alternative access to the same databases for sponsors and merchants. For example, (i) merchants can apply for participation in the service, and subsequently self provision card-related services (e.g., private-brand prepaid cards for use in their stores) tailored to their requirements; (ii) sponsors can buy prepaid/debit cards for their users, pay for them online, and trigger mechanisms for delivering the card(s) to their intended user(s).

Other debit platform(s) 365 represents platform(s) operated by other providers of debit services who avail themselves of this communications-based authentication/activation service. Once authentication is complete, Platform 360 informs other debit platform(s) 365 that the associated debit card should be activated. Other Debit Platform 365 then activates the gifted debit card and future transactions proceed as usual without further involvement from platform 360. In another embodiment, debit cards activated in this manner may continue providing prepaid phone services through platform 360.

While certain configurations of structures have been illustrated for the purposes of presenting the basic structures of the present invention, one of ordinary skill in the art will appreciate that other variations are possible which would still fall within the scope of the appended claims.

The invention claimed is:

1. A system for controlling use of a prepaid card, comprising:
   a voice message interface for receiving a voice message from a user attempting to authenticate the prepaid card;
   a memory for storing at least one telephone number corresponding to a sponsor of an account number of the prepaid card;
   a voice interface for providing the voice message to the at least one telephone number corresponding to the sponsor of the account number in response to the user attempting to authenticate the prepaid card; and
   a processor for activating the prepaid card after the sponsor has received the voice message and authenticated the user.

2. The system as claimed in claim 1, wherein the processor utilizes a telephone tone detector to authenticate the user.

3. The system as claimed in claim 1, wherein the processor utilizes a computer interface to authenticate the user.

4. The system as claimed in claim 1, wherein the processor utilizes a web interface to authenticate the user.

5. The system as claimed in claim 1, wherein the memory stores plural account numbers, each account number of the plural account numbers being associated with at least one telephone number corresponding to a sponsor of the corresponding account number.

6. The system as claimed in claim 1, wherein the prepaid card comprises a prepaid long distance calling card.

7. The system as claimed in claim 1, wherein the prepaid card comprises a prepaid debit card.

8. The system as claimed in claim 1, further comprising ANI receiving circuitry for determining an account number based on a dialed telephone number.

9. The system as claimed in claim 1, further comprising a tone detector for detecting an account number entered by receiving DTMF tones from the user when attempting to authenticate the prepaid card.

* * * * *